J. EATON.
CONTROL OF ELECTRIC MOTORS.
APPLICATION FILED DEC. 8, 1916.
1,328,501. Patented Jan. 20, 1920.
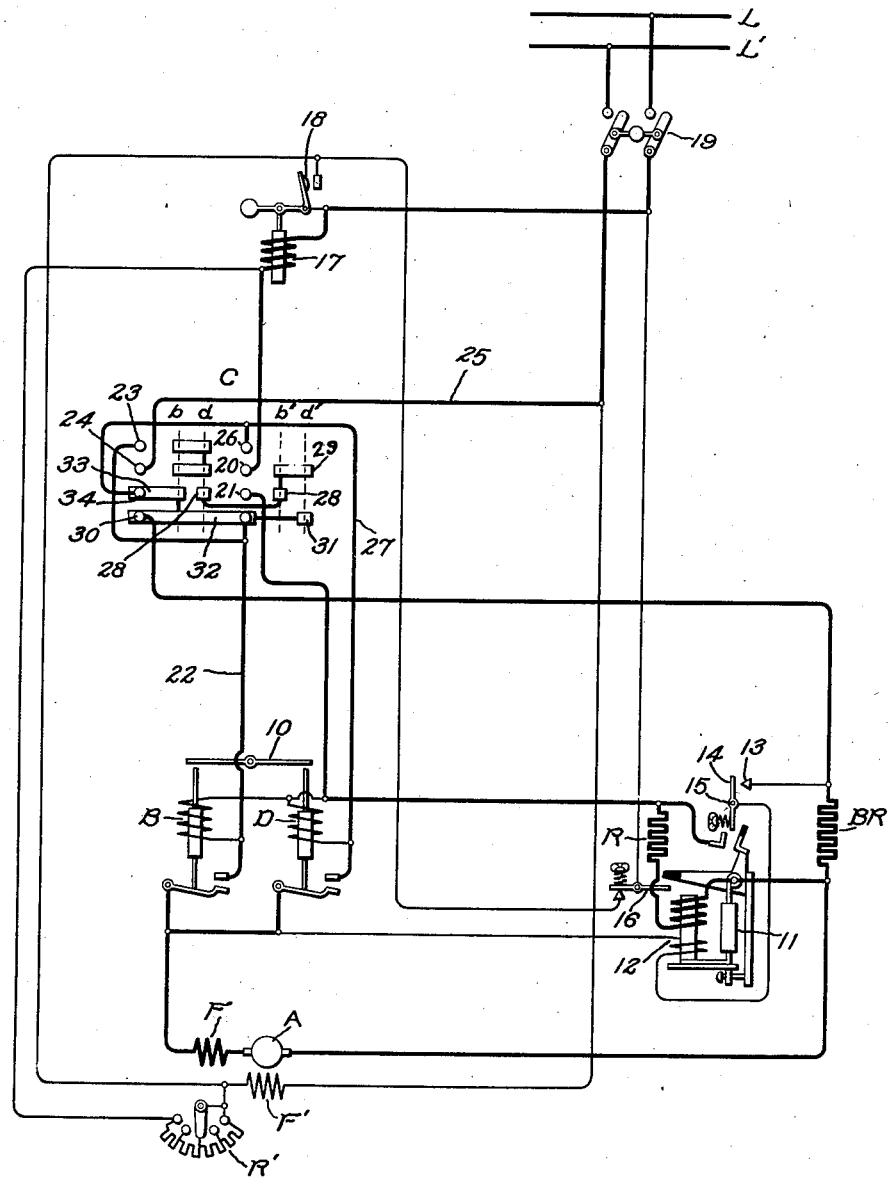
Inventor:
John Eaton,
by Albert H. Davis
His Attorney.

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

CONTROL OF ELECTRIC MOTORS.

1,328,501.      Specification of Letters Patent.      Patented Jan. 20, 1920.

Application filed December 8, 1916. Serial No. 135,892.

*To all whom it may concern:*

Be it known that I, JOHN EATON, a subject of the King of Great Britain, residing at Schenectady, in the county of Schenectady, State of New York, have invented certain new and useful Improvements in Control of Electric Motors, of which the following is a specification.

My invention relates to the control of electric motors and has for its object the provision of means whereby an electric motor may be started, stopped and generally controlled in a reliable, simple and efficient manner. While certain features of my invention are applicable to the control of electric motors generally, it is more particularly useful in connection with the control of reversing motors. In many cases, as for instance, in the control of motors for driving machine tools and the like the reversing action must take place quickly without the necessity of any skill on the part of the operator. The arrangement should be such that when it is desired to reverse the motor, the operator has nothing to do but throw the reversing switch or controller from full speed in one direction to full speed in the opposite direction. Ordinarily this might be a dangerous thing to do especially where the motor is driving a load having considerable inertia because of the heavy current which results from temporarily adding the line voltage to the counter electromotive force of the motor. Various systems have been devised for enabling the operator to throw the operating handle to the reverse position without actually making reverse motor connections until the motor speed has dropped to a safe value but these systems have involved complications which, while they might be justified in the control apparatus for a large motor, would be too expensive and complicated for a small motor. In the control of machine tools for instance the control apparatus must be simple and inexpensive and must also occupy a minimum of space.

In carrying out my invention I provide means whereby these desirable features may be provided in an extremely simple manner. By the use of my improved arrangement only two electromagnetic switches operating in conjunction with the reversing controller are necessary, one for each direction of rotation. In one form of my invention I interlock the two electromagnetic switches so that one can not close until the other opens, and arrange the energizing windings of the switches so that when one switch closes it will not open to permit the other switch to close until the motor speed has been reduced to a safe value. In the particular arrangement which I have illustrated the closure of each switch is due to a current being established through its winding at the controller contacts. After the switch is closed the winding is connected across the motor armature so that its energization is independent of the controller and depends solely upon the speed of the motor. The switch will, therefore, not open until the motor stops or has its speed substantially reduced. I also provide means whereby a dynamic braking circuit for stopping the motor is established when the controller is moved either to the "off" or reverse position. In this way when the operator throws the controller to the reverse position, a dynamic braking circuit is established which quickly stops the motor but although the electromagnetic switch for reverse operation is energized it will not close until the motor is brought substantially to rest.

In the accompanying drawing illustrating one form of my invention, A represents the armature, F' the shunt field and F the interpole field of the electric motor to be controlled. C represents a development of the controller which is manually operated. It is shown in the "off" position and has two operative positions. There are two sets of segments, viz, those to the left marked with the vertical dotted lines $b$—$d$ and those to the right marked $b'$—$d'$. There are also two vertical rows of contacts. In one position, which may be called the "forward" position, the segments are turned to the left until the segments on the left engage the left hand row of contacts on the line $b$, and the segments on the right engage the right hand row of contacts on the line $b'$. In the other operative position the segments are turned to the right so that the segments on the right engage the left hand row of contacts on the line $d'$ and the segments on the left engage the right hand row of contacts on the line $d'$. B and D indicate two electro-magnetic switches which coöperate with the controller C to reverse the motor. These two electromagnetic switches are mechanically interlocked so as to prevent one switch from closing until the other has opened. I have shown in a conventional way an interlocking bar 10 for accomplishing this purpose although any of the well-known means for interlocking switches may be employed if desired. The controller has two running positions, "forward" and "reverse," in addition to the "off" position in which the controller is shown. The arrangement of the energizing windings of these electromagnetic switches constitutes one of the important features of my invention. As hereinafter pointed out these switches are energized through contacts on the controller but after the switches close their windings are connected across the motor armature so that their deënergization and hence their opening will depend upon the speed of the motor. In the forward position of the controller C the segments engage the contacts on the lines marked $b—b'$ by moving the controller to the left, and in the reverse position the segments engage the contacts on the line marked $d$ and $d'$ by moving the controller to the right. In the forward position of the controller the motor circuits are made through the controller contacts and through the contacts of the electromagnetic switch or contactor B which is then energized and, in the reverse position, the motor circuits are made through the contacts of the controller and the contacts of the electromagnetic switch D, the circuits in the two cases being in reverse directions. For starting and accelerating the motor I provide the starting resistance R which is cut out of the motor circuit as the motor speeds up. Any well known means for cutting out this resistance may be employed but I have shown for purposes of illustration a contactor 11 of the well known type which holds open when the current is high and closes when the current drops to a predetermined value. This contactor in closing short circuits the resistance R and likewise completes a circuit for shunt holding coil 12 for the contactor at the contact 13. For this purpose a switch member 14 pivoted at 15 and spring pressed away from the contact 13 as shown in the drawing is engaged by the switch arm of the series contactor 11 when the latter closes and is forced into engagement with the contact 13. This shunt holding coil 12 holds the series contactor closed independently of the series winding so that the contactor will not open in case the current in the series winding is reduced for any reason. I also provide a switch 16 which is operated when the series contactor closes to insert a resistance R′ in the shunt field to speed up the motor. This resistance is inserted under the control of the series relay 17, the contact 18 of which vibrates under the control of the current in a well understood manner to bring the motor up to a speed corresponding to the amount of resistance R′ inserted in the motor field.

The operation of my device is as follows:

Normally the parts are all in the various positions shown in the drawing. Assuming that the line switch 19 is closed and the controller C is moved to the left into the forward position $b—b'$ the contactor B will immediately close, the circuit of its energizing winding being from the line L through the winding of the series relay 17, contact 20, through the controller segments to contact 21, thence through the winding B, conductor 22, contact 23, controller segments, contact 24 and conductor 25 to line L′. The motor circuit will now be completed as follows: from line L to contacts 20 and 21 on the controller, through the starting resistance R, series winding of the contactor 11, through the motor armature A and interpole field F, through the contacts of the contactor B and back to line L′ through the contacts 23 and 24 of the controller. The motor will now start in a forward direction with resistance in circuit and as the motor speeds up the contactor 11 will close in a well understood manner and short circuit the starting resistance R. When the contactor closes, the shunt holding coil is energized at the contacts 13 and 14. The closing of the contactor 11 also inserts the resistance R′ in the shunt field of the motor by opening the switch 16 in a well understood manner. The motor will now come up to full speed corresponding to the weakened field condition. In like manner if the controller were thrown to the reverse position, the contactor D would be energized, the circuit this time being from line L to contact 20 of the controller, thence through the controller segments to contact 26, thence through conductor 27, through the energizing winding to the contactor D and back to line through contact 21, segment 28, segment 29 which is now in engagement with contact 24, and conductor 25 back to line L′. With the contactor D closed the motor circuit may be easily traced.

Assume that the motor is running in a forward direction with the controller in the position $b$ and the contactor B closed, if the operator should desire to reverse the motor, it is only necessary to throw the controller to the reverse position $d$. As above pointed out the winding of the contactor B is no longer controlled by the controller but is connected across the motor armature through the contacts of the switch contacts which it controls. When, therefore, the controller is thrown to the reverse position contactor B does not open. The supply circuit is opened at the controller contacts but a dynamic braking circuit is completed from the motor armature through the braking resistance BR, contact 30, and segment 31 which is in engagement with it, segment 32, conductor 22 and contacts of the contactor B to the other side of the armature. The winding of the contactor D is now energized but the contactor cannot close since it is positively prevented from closing by the interlocking bar 10. Since the winding of the contactor B is connected across the motor armature this contactor will not open until the motor armature is brought substantially to rest or at least is reduced in speed to a safe value. When finally the contactor B opens the contactor D will close and complete the reverse connections as above pointed out. It will be seen, therefore, that if the controller is thrown to the reverse position, the motor connections for reverse operation are not completed until the armature is first reduced in speed the proper amount for safety. In like manner if the motor were running in the reverse direction and the controller thrown to the forward position the contactor D will not open until the motor speed is substantially reduced by the dynamic braking circuit which in this case will extend from the motor armature through the braking resistance to contact 30, segment 32, segment 33 and contact 34, conductor 27 and contacts of contactor D to the opposite side of the armature. It will be understood, of course, that each time the controller is reversed the contactor 11 opens to insert the starting resistance R so as to be ready for the reverse starting operation and the field resistance R' is likewise short circuited by the closing of the switch 16. It will be seen, therefore, that by the use of my invention the "plugging" of the motor, that is, the adding of the counter electromotive force to the line voltage upon reversal and hence the production of dangerous high currents is prevented by an extremely simple apparatus.

While I have described my invention as embodied in concrete form and as operating in a specific manner, in accordance with the provisions of the patent statutes, it should be understood that I do not limit my invention to the particular arrangement disclosed, since various modifications thereof will suggest themselves to those skilled in the art, without departing from the spirit of my invention, the scope of which is set forth in the annexed claims.

What I claim as new and desire to secure by Letters Patent of the United States is:—

1. Means for controlling an electric motor, comprising a main reversing controller having contacts carrying the motor current, an electromagnetic switch for the motor circuit having an operating winding controlled by said contacts, and connections whereby throwing the controller to the reverse position causes the winding of said switch to be energized in accordance with the speed of the motor.

2. Means for controlling an electric motor, comprising a main reversing controller carrying the motor current, an electromagnetic switch having contacts in the motor circuit and having an operating winding controlled by said controller, and connections whereby moving the controller to the off position causes a dynamic braking circuit to be established and maintained through the main controller and the contacts of the electromagnetic switch until the speed of the motor has decreased to a predetermined value.

3. Means for controlling an electric motor, comprising a main controller carrying the motor current, an electromagnetic switch having contacts in the motor circuit and an operating winding controlled by said controller, and connections whereby moving the controller to the off position establishes a dynamic braking circuit through the contacts of said switch and the controller and causes the switch winding to be energized in accordance with the speed of the motor.

4. Means for controlling an electric motor, comprising a main reversing controller carrying the motor current, an electromagnetic switch having contacts in the motor circuit and having an operating winding controlled by the contacts of said controller which carry the motor current, and connections whereby throwing the controller to the reverse position establishes a dynamic braking circuit through the contacts of said switch and causes the winding of said switch to be energized in accordance with the speed of the motor.

5. The combination with an electric motor and a source of supply therefor, of means for controlling the connection of the motor to the source, comprising a main controller having contacts carrying the motor current, an electromagnetic switch in the motor circuit having an operating winding controlled by said contacts, and connections whereby disconnecting the motor and the switch winding from the source by the operation of the controller causes the winding of said switch to be energized in accordance with the speed of the motor.

6. The combination with an electric motor and a source of supply therefor, of means for controlling the connection of the motor to the source, comprising a main reversing controller having contacts carrying the motor current, an electromagnetic switch in the motor circuit having an operating winding controlled by said contacts, and connections whereby moving the controller through the off position establishes a dynamic braking circuit through the controller and the switch contacts and causes the winding of said switch to be energized to prevent the connection of the motor to the source for operation in the reverse direction until the motor speed has decreased to a predetermined value.

7. The combination with an electric motor, of a source of supply therefor, means for controlling the motor, comprising normally open electromagnetic switch mechanism, a main reversing controller carrying the motor current having an off position at which the motor and the electromagnetic switch mechanism are disconnected from the source and two operative positions, one for each direction of motor operation, and connections whereby in each of said operative positions the electromagnetic switch mechanism is energized to close and connect the motor to the source through the controller contacts, after which the energization of the electromagnetic switch mechanism is dependent upon the speed of the motor.

8. The combination with an electric motor of a source of supply therefor, means for controlling the motor, comprising normally open electromagnetic switch mechanism, a main reversing controller carrying the motor current having an off position at which the motor and the electromagnetic switch mechanism are disconnected from the source of supply and two operative positions, one for each direction of motor operation, and connections whereby in each of said operative positions the electromagnetic switch mechanism is energized to close and connect the motor to the source through the controller contacts, after which the energization of the electromagnetic switch mechanism is dependent upon the motor armature voltage so that the opening of said switch mechanism will be governed by the speed of the motor.

9. The combination with an electric motor, of a source of supply therefor, means for controlling the motor, comprising normally open electromagnetic switch mechanism, a main reversing controller carrying the motor current having an off position at which the motor and the said switch mechanism are disconnected from the source and two operative positions, one for each direction of motor operation, and connections whereby in each of said operative positions the electromagnetic switch mechanism is energized to close and connect the motor to the source through the controller contacts, after which the energization of the electromagnetic switch mechanism is independent of the controller.

10. The combination with an electric motor, of a source of supply therefor, means for controlling the motor, comprising normally open electromagnetic switch mechanism, a main reversing controller carrying the motor current having an off position at which the motor and the said switch mechanism are disconnected from the source and two operative positions, one for each direction of motor operation, and connections whereby in each of said operative positions the electromagnetic switch mechanism is energized to close and connect the motor to the source through the controller contacts, after which the connection of the motor to the source of supply for operation in the reverse direction is dependent on the speed of the motor.

11. The combination with an electric motor, of means for controlling the same comprising two manually controlled electromagnetic switches, one for completing the motor circuit for each direction of rotation, means for preventing the closing of one of said switches until the other has opened and means whereby after one switch has operated to close the motor circuit its winding is connected to be energized in accordance with the speed of the motor.

12. The combination with an electric motor, of means for controlling the same comprising two normally open electromagnetic switches only one of which can be closed at a time, connections whereby the winding of each switch is energized in accordance with the speed of the motor when the switch closes and a manually operated switch having an energizing position for each switch winding.

13. The combination with an electric motor, of means for controlling the same comprising two normally open electromagnetic switches only one of which can be closed at a time, connections whereby the winding of each switch is energized in accordance with the speed of the motor when the switch is closed and a reversing controller having a position for each direction of rotation in which the winding of one of said switches is energized, the motor circuit in each position being through the controller and the contacts of the switch which is closed.

14. The combination with an electric motor, of a source of supply therefor, and means for controlling the motor comprising a reversing controller having an off position at which the motor is disconnected from the source and two operative positions, one for each direction of motor operation, a normally open electromagnetic switch energized in each position of the controller, only one of which can be closed at a time to close the motor circuit through the controller and connections whereby when a switch is closed in one position of the controller it will not open to permit the other switch to close when the controller is thrown to the reverse position until the speed is substantially reduced.

15. The combination with an electric motor, of means for controlling the same comprising two electromagnetic switches, one for completing the motor circuit for each direction of rotation, a manually operated switch for controlling the closing of said switches, means for preventing the closing of one of said switches until the other has opened, and connections whereby when one electromagnetic switch has closed to cause one direction of rotation its winding is energized in accordance with the speed of the motor so that the switch will not open to permit the other switch to close until the motor is brought substantially to rest.

16. The combination with an electric motor, of means for controlling the same comprising two electromagnetic switches one for completing the motor circuit for each direction of rotation, a manually operated switch for controlling the closing of said switches, means for preventing the closing of one of said switches until the other has opened, and connections whereby when one electromagnetic switch has closed to cause one direction of rotation its winding is connected across the motor armature so that the switches will not open to permit the other switch to close until the motor is brought substantially to rest.

17. The combination with an electric motor, of means for controlling the same comprising a reversing controller, two electromagnetic switches controlled thereby, one for each direction of rotation, having their contacts in the motor circuit in series with the controller contacts, means for preventing the closing of one of said switches until the other has opened, and connections whereby when the reversing controller is moved to cause the closure of one of said switches for one direction of rotation the winding of said switch is connected across the motor armature so that it will not open when the reversing controller is thrown to the reverse direction until the motor is brought substantially to rest.

18. The combination with an electric motor, of means for controlling the same comprising a manually operated controller having forward and reverse positions, two electromagnetic switches coöperating therewith to reverse the motor through the controller one of which is energized in each position of the controller, means whereby one switch can not close until the other switch opens and connections whereby when one switch closes it will not open to permit the other switch to close until the motor is brought substantially to rest.

19. The combination with an electric motor, of means for controlling the same comprising a manually operated controller having forward and reverse positions, two electromagnetic switches coöperating therewith to reverse the motor one of which is energized in each position of the controller, means whereby one switch can not close until the other switch opens, and connections whereby when one switch closes its winding is connected across the motor armature so that the opening of the switch contacts will be governed by the speed of the motor.

20. The combination with an electric motor, of means for controlling the same comprising a reversing controller, two electromagnetic switches controlled thereby, one for each direction of rotation, having their contacts in the motor circuit in series with the controller contacts, means for preventing the closing of one of said switches until the other has opened, and means whereby after one switch has operated to close the motor circuit it is governed in opening the motor circuit by the speed of the motor.

21. The combination with an electric motor, of means for controlling the same comprising a reversing controller, two electromagnetic switches controlled thereby one for each direction of rotation having their contacts in the motor circuit in series with the controller contacts, connections for making a dynamic braking circuit for the motor through the switch which is closed and the controller when the latter is moved to stop, or reverse the motor, means for preventing the closing of one of said switches until the other has opened, and means whereby after one switch has operated to close the motor circuit it is governed in opening the motor circuit by the speed of the motor.

In witness whereof I have hereunto set my hand this 7th day of December, 1916.

JOHN EATON.